Oct. 18, 1966
A. GUDMUNDSEN
3,279,272
SPROCKET FOR CHAIN SAW
Original Filed April 29, 1963
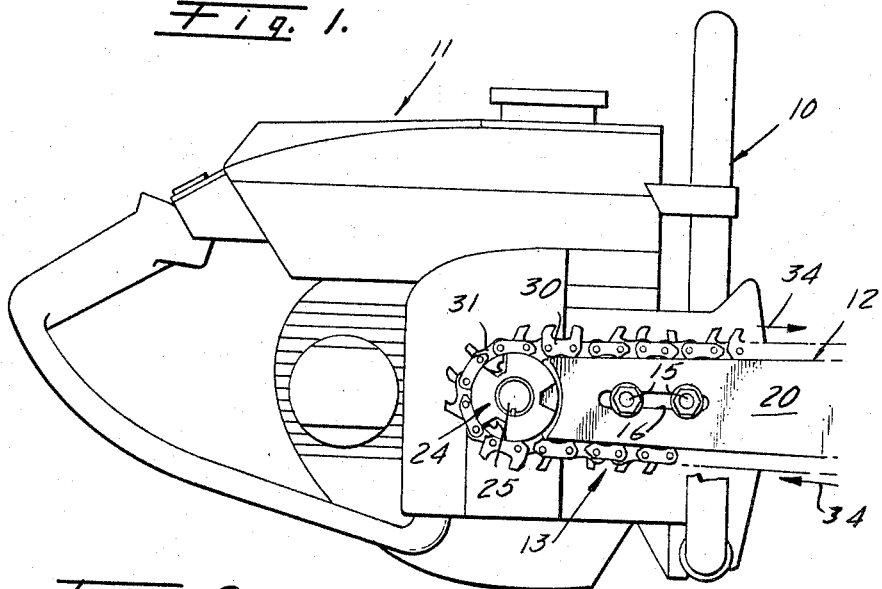
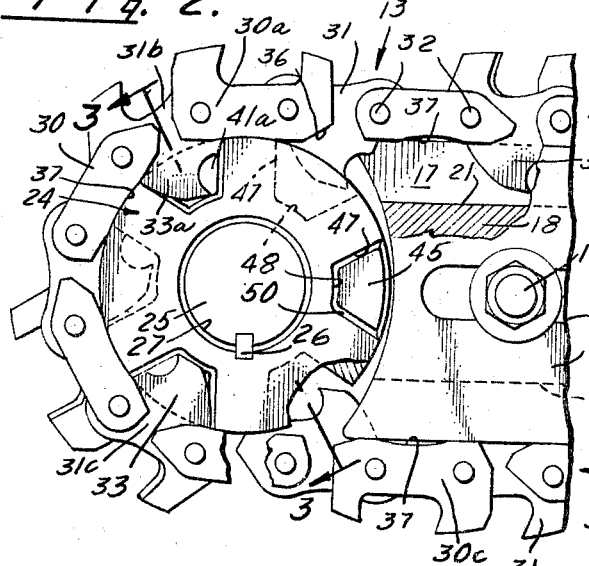
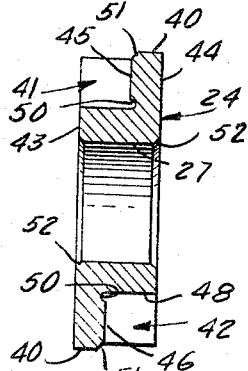
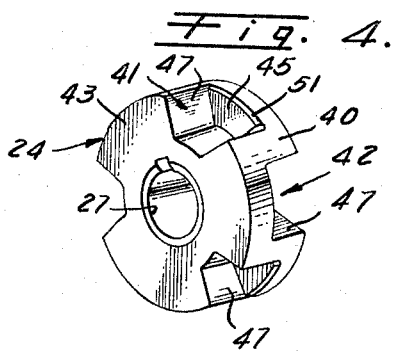
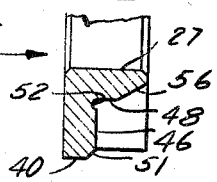
Austin Gudmundsen,
INVENTOR.
WHANN & McMANIGAL
Attorneys for Applicant
by

United States Patent Office 3,279,272
Patented Oct. 18, 1966

3,279,272
SPROCKET FOR CHAIN SAW
Austin Gudmundsen, Inglewood, Calif., assignor to McCulloch Corporation, Los Angeles, Calif., a corporation of Wisconsin
Continuation of application Ser. No. 276,573, Apr. 29, 1963. This application Oct. 20, 1965, Ser. No. 509,247
8 Claims. (Cl. 74—243)

This is a continuation application of Serial No. 276,573, filed April 29, 1963, and which has been abandoned.

This invention relates generally to sprockets and particularly relates to a sprocket for a saw chain.

A conventional chain saw includes a saw chain which is driven by a sprocket. Some prior art sprockets conventionally consist of an assembly of parts which are brazed together. As a result, the cost of the sprocket assembly is relatively high. Furthermore, it is difficult to hold close tolerances of the sprocket assembly. Finally, due to the fact that the parts constituting the sprocket are brazed together, the sprocket assembly may not always be strong enough to withstand the considerable load placed thereon during use.

It is well known that the saw chain and sprocket of a chain saw must be frequently replaced. During constant use the saw chain as well as the sprocket will last only a few days or at the most a few weeks depending on the materials to be cut. Therefore, a reduction in price of the sprocket is of great economical importance. If a conventional sprocket assembly should fail, both the saw chain and the sprocket should be replaced. Due to the high speed of the saw chain, wear and tear on both the saw chain and the sprocket is considerable. This wear increases unless the sprocket assembly can be maintained within very close tolerances.

It is accordingly an object of the present invention to provide a sprocket for a chain such as a saw chain and which consists of a single piece.

It is another object of the present invention to provide a sprocket for a saw chain and which is strong enough to withstand any normal use and which can be manufactured to close tolerances.

A further object of the present invention is to provide a single-piece sprocket which can be manufactured at a cost which is a fraction of that of a conventional sprocket assembly.

Still another object of the invention is to provide a one-piece sprocket for a saw chain and which will drive the chain, guide the chain along a circular path and prevent lateral movement of the chain with respect to the plane of its path.

Still a further object of the invention is to provide a sprocket for a saw chain and which prevents packing of the sawdust in the sprocket and which therefore does not require the provision of special holes to permit sawdust to leave enclosed pockets.

Yet a further object of the present invention is to provide a saw chain sprocket which minimizes wear and which minimizes shock loads on the saw chain.

A sprocket in accordance with the present invention is designed to drive a chain of the type having side links and center links alternately connected by hinge means. Each of the center links has a sprocket-engaging projection or tang.

The sprocket of the present invention comprises a single disc having an outer surface forming a cylinder and two side walls. Outwardly open recesses are provided in the disc in such a manner that successive recesses along the circumference of the disc extend from the cylindrical surface to alternate side walls. These recesses receive and guide successive tangs of the chain in such a manner that the chain is prevented from moving laterally with respect to a plane defined by the movement of the chain.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 1 is a side elevational view of a chain saw, parts being broken away, and embodying the sprocket of the present invention;

FIG. 2 is an enlarged fragmentary side elevational view of a saw chain and the drive sprocket of the invention shown in FIG. 1;

FIG. 3 is a cross-sectional view taken on line 3—3 of FIG. 2 and illustrating the sprocket of the invention;

FIG. 4 is a view in perspective of the sprocket of FIG. 3; and

FIG. 5 is a partial cross-sectional view similar to that of FIG. 3 and illustrating a modification of the sprocket of the invention.

Referring now to the drawings there is illustrated in FIG. 1 a chain saw generally indicated at 10 having a frame or housing 11 enclosing the engine of the chain saw, a bar or blade 12 and a saw chain 13 which is driven by the engine and travels on the bar 12.

The bar 12 is adjustably secured to the housing 11 by bolts 15 extending through a slot 16 in the bar 12. Hence, the bar may be adjusted to allow for lengthening of the saw chain during use. The bar 12 is of the grooved type and as shown in FIG. 2 is formed of three laminated plates 17, 18 and 20. The outer plates 17 and 20 are coextensive and the center plate 18 is overlapped at its opposite transverse edges by the outer plates to form a groove 21 therebetween. The groove 21 extends over the nose of the bar 12 where the center plate 18 is shorter than the outer plates 17 and 20.

The chain is driven by a single-piece sprocket generally indicated at 24 which may be keyed to an engine drive shaft 25 by a key 26 as shown particularly in FIG. 2. In the chain saw illustrated in FIGS. 1 and 2, the engine drive shaft 25 may be connected to the engine through a gear set. Alternatively, the chain saw may have a direct drive including a clutch, not shown, which may be coupled to the engine directly by centrifugal forces. In that case, the sprocket 24 may be brazed or otherwise secured to the clutch drum and may be supported at its center through a stationary shaft and a suitable bearing such as a roller bearing. Thus, the single-piece sprocket 24 may have a central aperture or bore 27 through which the engine drive shaft 25 or a supporting shaft may extend.

Before describing the single-piece sprocket 24 of the present invention in detail, the construction of the saw chain 13 will first be explained.

As shown in FIGS. 1 and 2, the saw chain includes side links 30 and center links 31, alternately connected by pintles 32. Extending from the center links 31 are sprocket-engaging projections or tangs 33. The tangs 33 extend inwardly on the chain as shown in FIGS. 1 and 2 so that they are disposed in the bar groove 21 while the side links 30 ride on the outer peripheral edges of the outer plates 17 and 20 of the bar 12. The saw chain 13 is driven by the sprocket 24 in the direction of the arrows 34. Thus, the lower portion of the saw chain 13 moves toward the left while the upper portion moves toward the right while the sprocket 24 rotates in a clockwise direction as viewed in FIGS. 1 and 2.

To further aid in positioning the saw chain radially on the sprocket 24, each side link 30 preferably has a longitudinally arced, inwardly facing surface 37. The radius of each arced surface 37 is the same as that of the outer circumference of the sprocket 24. As a result, the chain saw rides smoothly over the sprocket 24 along a portion of a circle. Accordingly, there are substantially no variations in pressure between the chain and the sprocket and consequently there is no vibration and relatively little wear on the chain and sprocket to provide a very smooth running chain.

The construction of the one-piece sprocket embodying the present invention will now be described. As shown particularly in FIG. 4 the sprocket 24 has an outer surface 40 forming a cylinder. The thus formed solid cylinder is provided with side recesses 41 and 42 opening or extending into alternate side walls 43 and 44 of the sprocket. The purpose of the alternate recesses 41 and 42 is to receive successive tangs 33 of the chain saw 13.

Thus, each of the recesses has respective vertical inner end walls 45 and 46. The inner end walls 45 and 46 of the respective recesses are spaced from each other by a distance equal to the width of the tangs 33. In other words, the two planes extending through the vertical walls 45 and 46 are spaced from each other by the width of the tangs 33. The respective recesses may have sloping forward and rearward walls 47 of a shape and of such dimension as to receive the tangs 33. The bottom wall 48 of each of the recesses 41 and 42 may be substantially straight in the axial direction as shown particularly in FIG. 3.

Preferably, a fillet 50 is provided where the vertical walls 45 and 46 meet the respective forward and rearward walls 47 and bottom walls 48. The purpose of the fillet 50 is to insure that the tangs 33 snugly engage the respective vertical walls 45 and 46 of the recesses and that there is no outwardly extending projection at the line between the vertical walls 45 and 46, the forward and rearward walls 47 and the bottom wall 48. A beveled edge 51 may be provided where the vertical walls 45 or 46 meet the outer cylindrical surface 40 to permit ease of entry of the tangs into the recesses 41 and 42. Similarly, the central aperture 27 may be beveled as at 52 adjacent the side walls 43 and 44.

It will be noted that the outer cylindrical surface 40 of the sprocket 24 is continuous and extends about successive pockets 41 and 42. As a result, successive side links 30 are at least partially supported by the outer cylindrical surface 40 between adjacent recesses. In particular, the arcuate surfaces 37 are securely supported by the outer cylindrical surface 40 of the sprocket 24.

The one-piece sprocket 24 may, for example, be cast or forged or may be sintered from powdered metal. Precision casting may, for example, be accomplished by the lost wax method. After the one-piece sprocket 24 has been cast or forged, for example, from steel, the casting or forging may be carburized throughout a certain depth except for the central bore and thereafter case-hardened. Preferably, the sprocket is hardened in such a manner that it becomes considerably harder than the respective links of the saw chain 13. This will minimize wear of the sprocket and thus provide for a longer life of the sprocket and chain assembly.

It may be noted that the single-piece sprocket of the present invention may be made at a cost of less than one-third of a prior art sprocket assembly consisting of several parts which must be brazed together. It may also be noted that saw dust or wood chips cannot be packed into the alternate recesses 41 and 42 because the recesses are outwardly open. This in turn makes it unnecessary to provide special apertures for the sawdust to leave enclosed spaces which are usually found in prior art sprockets. It will also be apparent that the sprocket necessarily must have an even number of recesses. In other words, there must be pairs of alternate recesses 41 and 42.

Lateral movement of the saw chain, that is, movement at right angles to the directioin of movement of the chain is prevented by the provision of the vertical walls 45 and 46 of alternate recesses. Since the chain is relatively rigid in a directioin at right angles to its plane of movement, the chain cannot move laterally because each of the tangs 33 is held by one of the vertical walls such as 45 and 46 which are spaced by the width of the tangs. Thus, the chain is securely guided along a smooth path extending over a portion of a circle.

A modified sprocket 55 is illustrated in FIG. 5. This sprocket has generally the same construction as that shown in FIGS. 1 through 4. However, for ease of manufacture and in order to save metal, the bottom wall 48 of the respective recesses may have an inwardly sloping surface 56 as clearly shown in FIG. 5. In other words, the surface 56 slopes toward the axis of rotation of the sprocket. Otherwise, the construction of the sprocket 55 is the same as previously described.

It may also be noted that preferably the size of successive recesses 41 and 42 is somewhat larger than that of the tangs 31. The pitch of the driving surfaces of the sprocket is slightly greater than the pitch of the chain. As a result, the rear edge of each tang 33 does not engage the driving wall 47 until the tang 33a has reached the recesses 41a. Thus, the drive occurs as the chain leaves the sprocket. Consequently, no interference is encountered as the chain initially engages the sprocket as clearly shown in FIG. 2. As a result, the engaging action is particularly smooth. Hence, as the sprocket rotates, the tangs gradually change from a relative non-contacting position to a contacting position. Thus, the tang 33a finally takes the position in the recess 41a in contact with the driving wall 47. This construction again minimizes wear which occurs in conventional chain where the center links and their tangs pound the sprockets as they first engage therewith.

There has thus been disclosed a single-piece sprocket for use with a chain such as a saw chain. The sprocket of unitary construction serves the purpose to drive the chain and to guide it in a smooth path extending over a portion of a circle as it engages the sprocket. The sprocket of the present invention will positively prevent sidewise movement of the chain as it drives over the sprocket. The construction is such that sawdust cannot collect or be packed in the sprocket because the sprocket has no enclosed openings or recesses. The construction of the sprocket in combination with the saw chain is such as to minimize wear and to minimize tetering of the saw chain. The sprocket itself can be cast, forged or sintered and thereafter hardened. As a result, the sprocket can be manufactured in mass production at a price which is a fraction of that of prior art socket assemblies. On the other hand, due to its unitary construction, it is stronger and less subject to wear and thus will stand up as long as its saw chain.

The invention and its attendant advantages will be understood from the foregoing description. It will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific form shown or uses mentioned except as defined in the accompanying claims, wherein various portions have been separated for clarity of reading and not for emphasis.

I claim:

1. In a sprocket for an articulate saw chain having side links and center links alternately connected by pintles, and sprocket engaging tangs extending inwardly from the center links, said sprocket comprising:
   (a) a unitary solid disc, the outer peripheral surface of which is cylindrical, and having an axial opening to receive a shaft,
   (b) said disc having oppositely arranged parallel sides forming side walls, said side walls being flat and parallel for their full extent;
   (c) there being a plurality of annularly spaced recesses extending into alternate side walls, (d) said recesses extending radially inwardly from the periphery of the disc and the recesses of one side being staggered relative to the recesses of the other side for alternate reception of the chain tangs;

(e) each of said recesses having a vertical inner end wall in a plane perpendicular to the axis of the disc, (f) said inner end walls being spaced axially relative to each other a distance equal to the width of the tangs of the saw chain to be used with said sprocket;

(g) the respective recesses having annularly spaced, continuously flat side walls and a bottom wall; and (h) the outer cylindrical surface of the sprocket disc being continuous and extending about successive recesses so that successive side links of the chain are supported by the outer cylindrical surface between adjacent recesses.

2. In a sprocket for an articulate saw chain having side links and center links alternately connected by pintles, certain of said links having cutter teeth thereon, the inner edges of said side links being longitudinally arced, and sprocket engaging tangs extending inwardly from the center links, said sprocket comprising:

(a) a unitary solid disc, the outer surface of which is cylindrical, and having an axial opening to receive a shaft, (b) said disc having oppositely arranged parallel sides forming side walls, said side walls being flat and parallel for their full extent;

(c) there being a plurality of annularly extending and annularly spaced recesses extending longitudinally inwardly from each side wall to a point beyond the longitudinal center plane of the disc and extending radially outwardly to the periphery of said disc, (d) the recesses of one side being staggered relative to the recesses of the other side, said recesses being adapted for alternate reception of the chain tangs, (e) said recesses being defined at their inner ends by respective inner end walls in a plane perpendicular to the axis of the disc, (f) inner end walls of one side being parallel to and spaced axially relative to the inner end walls of the other side a distance equal to the width of the tangs of the saw chain to be used with said sprocket, said inner end walls stabilizing the chain portion on the sprocket and holding the tangs against lateral wobbling; and (g) the outer cylindrical surface of the sprocket disc being continuous and extending along the inner ends of successive recesses so that successive side links of the chain are supported by the outer cylindrical surface between adjacent recesses.

3. In a sprocket for an articulate saw chain having side links and center links alternately connected together by pivot means, said center links having inwardly extending sprocket engaging elements, said sprocket comprising:

(a) a unitary solid disc, the outer peripheral surface of which is cylindrical, and having an axial opening to receive a shaft, (b) said disc having oppositely arranged parallel sides said sides being flat and parallel for their full extent, (c) there being a plurality of annulary spaced annularly extending recesses extending into alternate sides, (d) said recesses extending radially inwardly from the periphery of the disc and the recesses of one side being staggered relative to the recesses of the other side for alternate reception of the sprocket engaging elements of the saw chain;

(e) each of said recesses having a vertical inner end wall in a plane perpendicular to the axis of the disc, (f) said inner end walls being parallel to and spaced axially relative to each other a distance equal to the thickness of the sprocket engaging elements of the saw chain to be used with said sprocket;

(g) each of said recesses having a bottom wall, formed of straight lines parallel to the disc axis, said bottom wall being at the radial inner end of the inner end wall, and each recess having a continuously flat forward and rearward wall extending generally radially outwardly from said bottom wall; and (h) the outer cylindrical surface of the sprocket disc being continuous and extending about successive recesses so that the side links of the chain are supported by the outer cylindrical surface between adjacent recesses.

4. In a sprocket for an articulate saw chain having side links and center links alternatively connected together by pivot means, said center links having inwardly extending sprocket engaging elements, said sprocket comprising:

(a) a unitary disc, the outer peripheral surface of which is cylindrical;

(b) there being a plurality of annularly extending annularly spaced recesses in opposite sides of said disc, (c) said recesses extending radially inwardly from the cylindrical peripheral surface of the disc, (d) the recesses of one side being staggered relative to the recesses of the other side;

(e) each of said recesses having a vertical inner end wall in a plane perpendicular to the axis of the disc, (f) said inner end walls being spaced axially relative to each other a distance equal to the width of the sprocket engaging elements of the saw chain to be used with said sprocket;

(g) each of said recesses having a bottom wall at the radial inner end of the inner end wall and having a continously flat forward and rearward wall extending geenrally radially outwardly from said bottom wall; and (h) a fillet radially inwardly of each inner end wall and adjoining corresponding bottom and inner end walls.

5. The invention defined by claim 4 wherein the outer cylindrical surface of the sprocket disc is continuous and extends about successive recesses so that successive side links of the chain are supported by the outer cylindrical surface between adjacent recesses.

6. The invention defined by claim 4 wherein said cylindrical peripheral surface and said inner end walls are joined by a beveled surface, each inner end wall being continuous between said beveled surface and said fillet.

7. In a sprocket for an articulate saw chain having side links and center links alternately connected together by pivot means, said center links having inwardly extending sprocket engaging elements, said sprocket comprising:

(a) a unitary disc, the outer peripheral surface of which is cylindrical, (b) said disc having oppositely arranged parallel sides, said sides being flat and parallel for their full extent;

(c) there being a plurality of annularly extending annularly spaced recesses in opposite sides of said disc, (d) said recesses extending radially inwardly from the cylindrical peripheral surface of the disc, (e) the recesses of one side being staggered relative to the recesses of the other side;

(f) each of said recesses having a vertical inner end wall in a plane perpendicular to the axis of the disc; and (g) said inner end walls being spaced axially relative to each other a distance equal to the width of the sprocket engaging elements of the saw chain to be used with said sprocket, (h) said cylindrical surface periphery and said inner end walls being joined by a beveled surface, each inner end wall being flat and continuous inwardly of said beveled surface.

8. In combination, in a chain saw having a sprocket mounted thereon for driving a saw chain formed of alternate side and center links joined by pivot means, said center links having inwardly extending sprocket engaging tangs, said side links having longitudinally arced inwardly directed surfaces for riding on said sprocket, the improvement comprising:

(a) the sprocket being formed of a solid disc, the outer peripheral surface of which is cylindrical,
(b) said disc having oppositely arranged parallel sides, said sides being flat and parallel for their full extent;
(c) there being a plurality of annularly spaced annularly extending recesses extending into alternate sides,
(d) said recesses extending radially inwardly from the periphery of the disc and the recesses of one side being staggered relative to the recesses of the other side for alternately receiving the tangs on the center links;
(e) each of said recesses having a vertical inner end wall in a plane perpendicular to the axis of the disc,
(f) said inner end walls being parallel to and spaced axially relative to each other a distance equal to the thickness of the tangs;
(g) each of said recesses having a bottom wall and having a continuously flat forward and a rearward wall extending generally radially outwardly from said bottom wall;
(h) at least one of said rearward walls being in driving engagement with one of said tangs;
(i) the outer cylindrical surface of the sprocket disc being continuous and extending about successive recesses, and
(j) said longitudinally arced surfaces of said side links being supported by the outer cylindrical surface between adjacent recesses, the arced surfaces on said side links having the same radii as that of the outer cylindrical surface of said sprocket disc.

References Cited by the Examiner
UNITED STATES PATENTS

| | | |
|---|---|---|
| 1,549,594 | 8/1925 | Menninger _____ 74—243 |
| 1,869,529 | 8/1932 | Urschel. |
| 2,515,383 | 7/1950 | Sneva _____ 77—62 |
| 2,884,798 | 5/1959 | Wilson _____ 143—32 X |
| 3,015,242 | 1/1962 | Armacost _____ 77—62 |
| 3,045,502 | 7/1962 | Carlton _____ 143—32 |
| 3,163,052 | 12/1964 | Oehrli et al. _____ 143—32 X |

DONALD R. SCHRAN, *Primary Examiner.*